Figure 1:
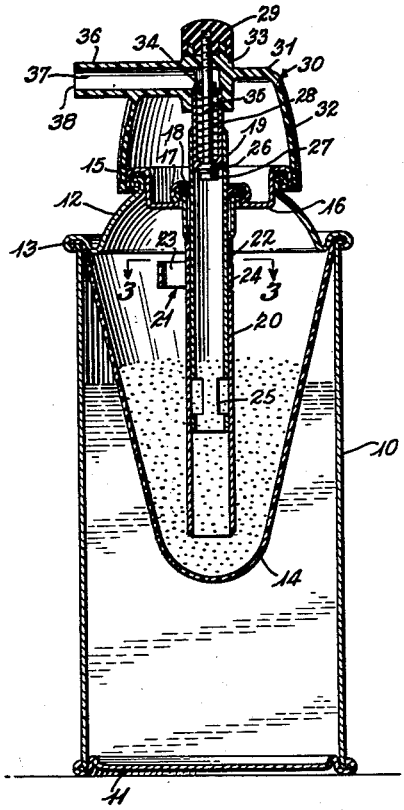

March 9, 1965  J. P. MODDERNO  3,172,568
PRESSURIZED DISPENSING DEVICE
Filed March 27, 1959  5 Sheets-Sheet 1

INVENTOR
John Paul Modderno

BY Stevens, Davis, Miller & Mosher
ATTORNEYS

March 9, 1965 J. P. MODDERNO 3,172,568
PRESSURIZED DISPENSING DEVICE
Filed March 27, 1959 5 Sheets-Sheet 2

INVENTOR
*John Paul Modderno*

BY *Stevens, Davis, Miller & Mosher*
ATTORNEYS

March 9, 1965   J. P. MODDERNO   3,172,568
PRESSURIZED DISPENSING DEVICE
Filed March 27, 1959   5 Sheets-Sheet 3
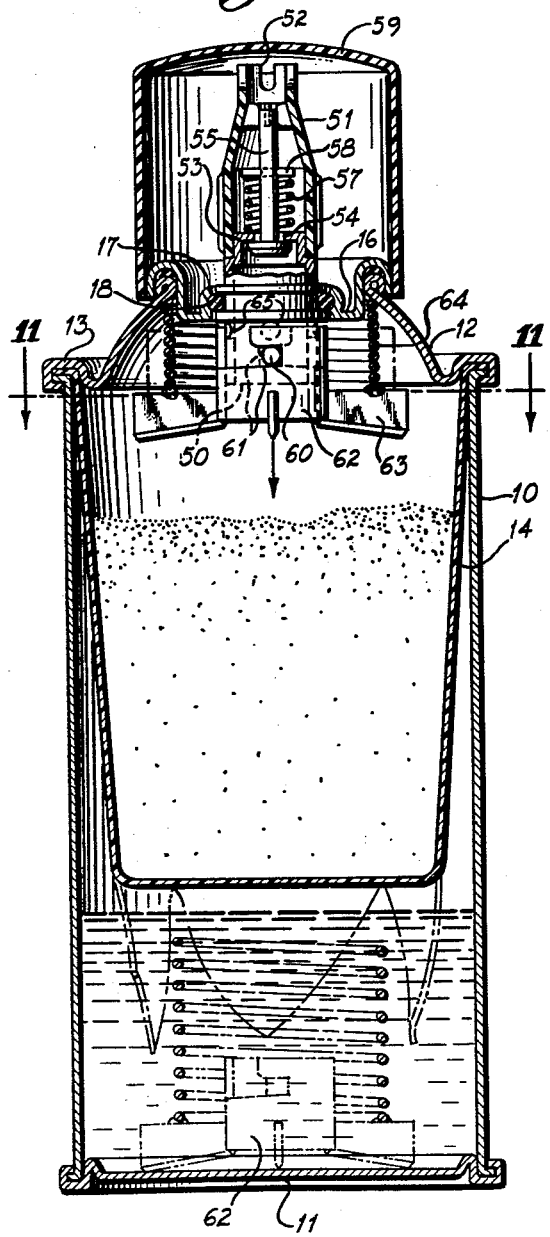
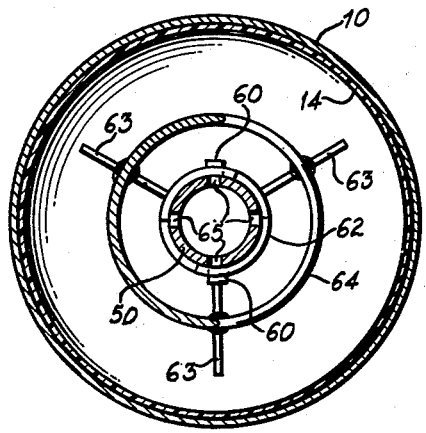
INVENTOR
John Paul Modderno

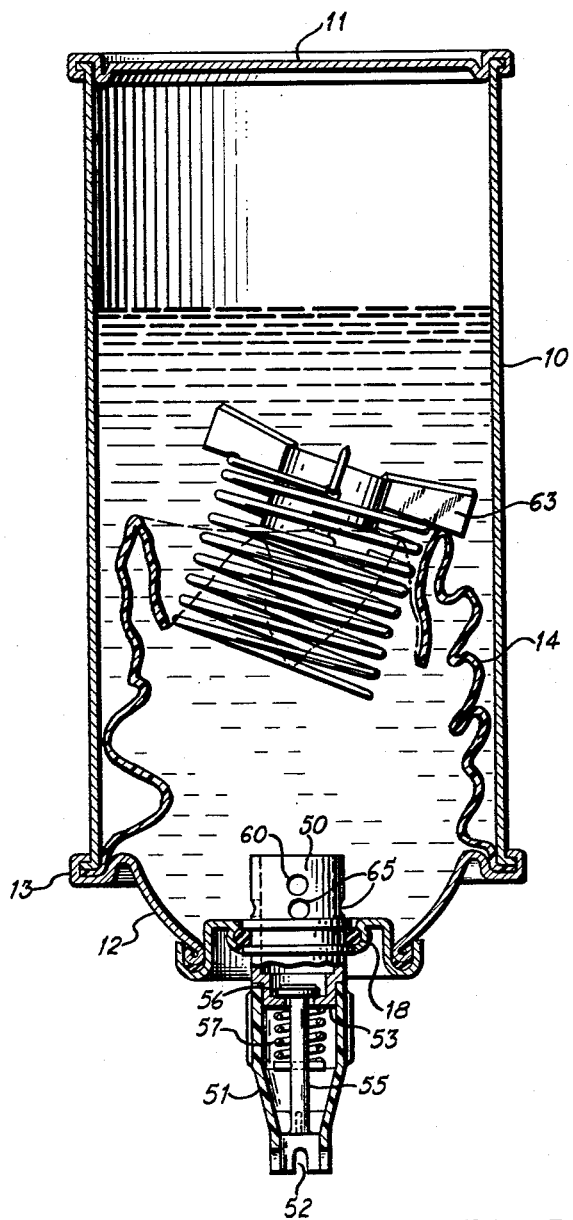

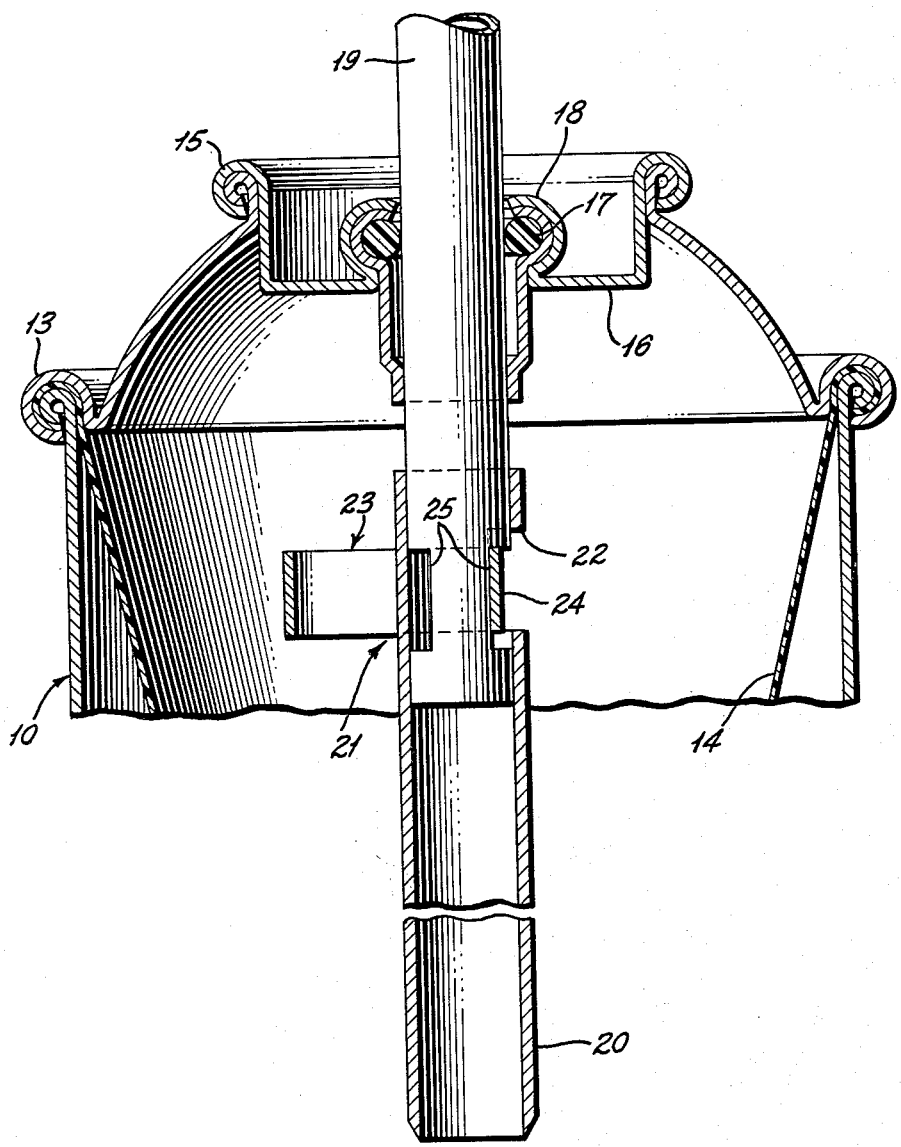

United States Patent Office 3,172,568
Patented Mar. 9, 1965

3,172,568
PRESSURIZED DISPENSING DEVICE
John Paul Modderno, Gambrills, Md., assignor to Modern-Lab., Incorporated, Baltimore, Md., a corporation of Maryland
Filed Mar. 27, 1959, Ser. No. 802,501
4 Claims. (Cl. 222—80)

This invention relates to a compartmental, pressurized dispensing device for keeping two or more materials separated from each other until time of use. More particularly, this invention relates to a pressurized container for dispensing a composition produced when diaphragms separating the container into compartments are ruptured so that the ingredients from the compartments can be thoroughly mixed and be dispelled by pressure within the container. This application is a continuation-in-part of my applications for Letters Patent, now abandoned, Serial No. 581,905, filed May 1, 1956; and Serial No. 650,140, filed April 2, 1957, now abandoned.

It will be appreciated that there are various compositions which cannot be marketed in premixed form. Such compositions may be composed of a solid granular portion and a liquid portion, two or more liquid portions, gaseous and liquid portions, or gaseous and solid granular portions, which cannot be mixed together prior to the time of actual use because of the nature of the composition so formed or incompatibility of periods of long storage. Such materials require special packaging and dispensing in order to maintain the portions distinct in storage condition during shipment and in storage prior to sale.

The present invention is directed to the dispensing of all types of compositions, the ingredients of which must be kept separated until actual use of the composition they make, and a means for storing, for combining and mixing, and for dispensing the composition formed from the materials. Such a device has found specific utility with respect to all types of aerosols and pressurized dispensing containers. Exemplary of such materials are coagulable compositions which form in situ on the human body a covering, mask, or the like, disclosed in co-pending application Serial No. 526,076, filed Aug. 2, 1955; dispensable dental compositions and other body treating compositions disclosed in copending application Serial No. 611,386, filed Sept. 21, 1956, both of which were abandoned in favor of continuation application Serial No. 100,786, filed Apr. 7, 1961, now Patent No. 2,996,432; and the like. The device is also useful for the storage, mixing, and dispensing of food products, the ingredients of which must be kept separate until use. For example, in the case of facial treating compositions or the like, the compositions are composed of a powdered portion and a liquid emulsion portion which cannot by the nature of their ingredients be brought together until use is desired. It is essential in the commercialization of a product of this nature to hold the ingredients forming the composition in a state of inactivity for indefinite periods of time in order to allow for shipping and storage periods and yet provide an effective product formed from the ingredients as the desired composition is needed. The dispensing compartmentalized container of this invention meets these needs as it allows for storage of the separate ingredients but provides for instant formation and use of the composition when desired by providing a combination of separating means, means for rupturing the separating means so that the ingredients can be brought together and mixed, and means for expulsion of the composition from the container in such a way that it can be utilized for home or commercial consumption in a manner heretofore unknown in the art.

Advantageously, the means for rupturing the partition can be spring propelled. After rupture the container then can be inverted and the contents dispensed therefrom. In this inverted position the film hugs the top of the container and the areas around the valve inlet opening can have a means for preventing the ruptured partition from fouling the opening.

Also the propellant may be a gas, liquid or solid capable of sublimation at normal temperatures and when the pressure is reduced, by dispensing contents from the container, the propellant performs a dual function of instantaneously mixing the ingredients together to form the dispensable composition and for dispensing the composition therefrom.

It is an object of the invention to provide a compartmental, pressurized dispensing device for keeping ingredients of a composition separated until its use is desired, having a telescoping discharge tube arrangement for rupturing the partition separating the ingredients.

Another object of this invention is to provide a partition rupturing mechanism which may be triggered to rupture the partition separating the ingredients within the pressurized container to effect mixing of the ingredients.

A further object is to provide a compartmental, pressurized dispensing device having a telescoping mechanism which serves to rupture the dividing wall between ingredients to be mixed together which can be motivated from outside the container.

A still further object is to provide a telescoping discharge tube dispensing head which, upon partial withdrawal from the container, elongates to form a rupturing plunger which, when depressed, ruptures the partition between compartments and enters into locking engagement with the top portion of a container device so as to provide a dispensing unit capable of dispensing therefrom a composition formed from the ingredients in the separate compartments.

Another object is to provide a dispensing device in which a means for rupturing the partition between compartments is propelled.

A still further object is to provide a dispensing container in which a propellant is used to mix and dispense the contents of a pressurized container after rupturing of compartments therein.

Additional objects of the invention will become apparent from an examination of the drawings, specification, and appended claims.

The invention will be described further in connection with the accompanying drawings, which are to be considered an exemplification of the invention and do not constitute limitation thereof.

Figure 2:
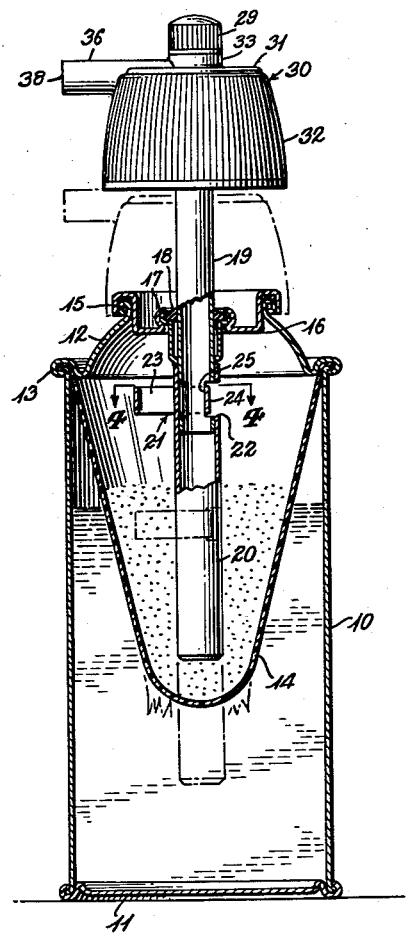
Figure 5:
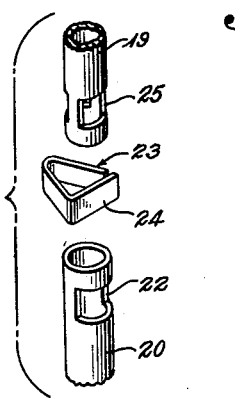
Figure 3:
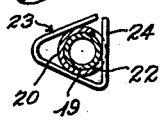
Figure 4:
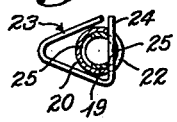
Figure 6:
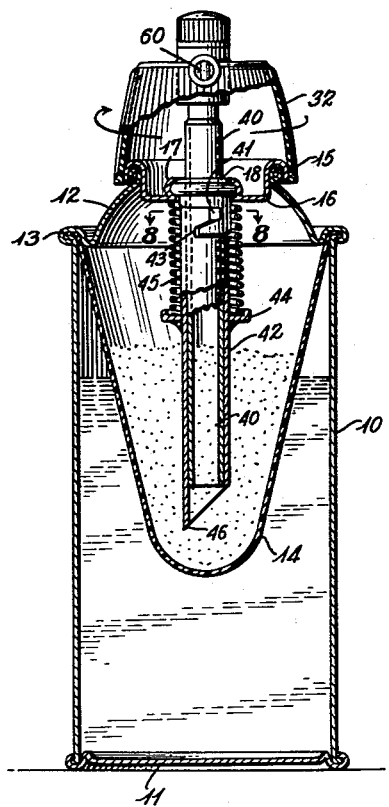
Figure 7:
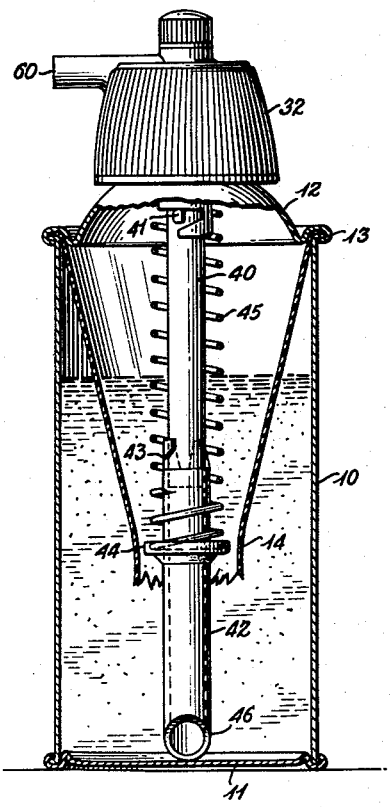
Figure 9:
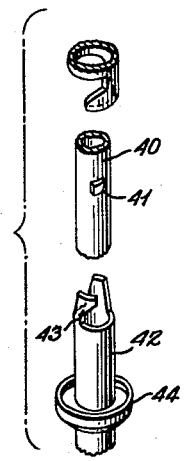
Figure 8:

In the drawings,

FIGURE 1 is a cross-sectional view showing a compartmentalized container with the rupturing means in an inactive position, FIGURE 2 is a cross-sectional view in elevation showing the rupturing mechanism in extended position, FIGURE 3 is a cross-sectional view when on line 3—3 of FIGURE 1 showing the locking arrangement for locking the telescoping tube of the device in an extended position, FIGURE 4 is a cross-sectional view taken on the line 4—4 of FIGURE 2 showing locking arrangement in locked position, FIGURE 5 is an exploded view of the telescoping arrangement and the locking device, FIGURE 6 is a cross-sectional view showing the compartmentalized container with a spring-biased rupturing mechanism, FIGURE 7 is a cross-sectional view showing the compartmentalized container with the spring-biased rupturing mechanism in an extended position, FIGURE 8 is a cross-sectional view taken on the line 8—8 of FIGURE 6 showing the locking device for holding the spring-biased mechanism in a biased position, FIGURE 9 is an exploded view of the spring-biased locking and rupturing mechanism, FIGURE 10 is a cross-sectional view in elevation showing a compartmentalized container with a spring-biased rupturing means, FIGURE 11 is a horizontal cross-sectional view taken on the line 11—11 of FIGURE 10 showing the rupturing means, FIGURE 12 is a cross-sectional view in elevation of the container with the film separating the container into compartments ruptured and the container inverted for use, and FIGURE 13 is an enlarged view of a portion of the container shown in FIGURES 1 and 2 illustrating the position of the upper end of the outer telescoping tube with respect to the dependent portion of the circular flange when the spring clip is engaged and the inner telescoping tube is partly depressed, and the inner telescoping tube extending through the annular gasket positioned in the circular flange.

Referring now to the drawings, FIGURES 1 through 5 illustrate a form of the pressurized dispensing device of the present invention. The device consists of an open top main container 10 having a bottom portion 11 and a cup-shaped cover 12 fitted into the open top of container 10 and clinched by rolling a flange 13 to provide an hermetic seal between the cover 12 and the container 10. Disposed within the container 10 is a downwardly depending sac 14 made of a pliant film so arranged that the upper sides thereof fit over the edge of the top rim of the container 10 so that the crimping of the cup-shaped cover 12 divides the container into two separate compartments sealed from each other by the pliant film. The top of the cover 12 defines a central aperture with the portion of the cover forming the boundary of an aperture being in the form of a rolled flange or bead 15. Seated into the aperture is an annular insert 16 having a rolled flange which embraces the bead 15 to form an hermetic seal at this point.

The annular insert 16 is so formed as to provide an inner circular flange 17 adapted to receive and retain an annular gasket 18 centrally with respect to the vertical axis of the container.

Slidably disposed in the annular opening of gasket 18 is a tube 19 which is free to telescope with a second tube 20. The lower end of tube 20 is within the container and is held in operative relation with tube 19 by a spring clip arrangement 21. The depending end of tube 20 is cut on a bias to provide a sharp piercing end. The piercing end resides above the bottom of the pliable film sac 14 when the tube 19 is telescoped in tube 20. Located in tube 20 near the cup-shaped cover is a slot 22. Disposed around tube 20 is a triangular spring clip 23 with one of its sides 24 lying in slot 22 and resting against tube 19. In the bottom portion of tube 19 is a second slot 25 adapted to receive side 24 (see FIG. 5).

Received in the top of the tube 19 is a valve unit comprising a valve seat 26 against which a valve 27 rests. The upper part of the valve is provided with a valve stem 28 which extends upwardly with its end threadedly engaging a top cap 29. Received onto the valve stem 28 is a dispensing member 30 composed essentially of a central rounded portion 31 and a depending skirt 32. On top of the dispensing member 30 and centrally located thereto is an annular boss 33 defining an opening through which the valve stem 28 extends. On the valve 28 is a boss portion 34. Interposed between the boss 34 and the upper side of the valve seat 26 is a compressible spring 35 which serves to urge the valve 27 against the valve seat 26. By screwing the top cap 29 so that it moves downwardly with respect to the container, the spring 35 is compressed thereby forming a closed seating of the valve to maintain the propellent gas under pressure in the can.

Integral with the central rounded portion 31 and the dependent skirt portion 32 is an elongated spout or nozzle portion 36 defining a central bore 37. The free end of the spout portion 36 defines a discharge orifice or opening in its outer wall as indicated by 38. The inner end of the central bore 36 communicates with the top of the tube 19 above the valve seat so that a passageway is provided, when the valve is unseated, from the container through the tube and out through the bore 37.

The bottom edge of the dependent skirt has an inwardly directed flange which, when the tube 19 is in a downward position, snaps into locking engagement with the rolled portion of the annular insert 16 to retain the tube 19 in a locked and depressed position. Tube 19 is adapted to slide in tube 20 in a telescoping fashion and when the dispensing head member 30 is raised, tube 19 is pulled upwards sliding through the hole in annular gasket 18 which tube 20 is retained against the underside of the gasket and preventing from moving downwardly by the compression force of side 24 of spring clip 23 against the outer surface of tube 19.

An alternate dispensing arrangement is shown in FIGURES 6 through 9 in which an open top main container 10 has a bottom portion 11 and a cup-shaped cover 12 fitted onto the opening of the top of container 10 by clinching or rolling a flange 13 to provide an hermetic seal between the cover and the container. Disposed in container 10 is a downwardly depending sac 14 made of pliant film or similar type of rupturable material so arranged that when the upper side of the sac is fitted over the edges of the top rim of container 10, there are formed sealed compartments in container 10. This clinched arrangement provides for hermetic sealing of the container and assurance that each compartment is hermetically sealed from the other.

As heretofore described, an annular inset 16 is provided having a circular flange 17 adapted to receive and retain an annular sealing gasket 18 centrally with respect to the vertical aixs of the container. Disposed within the annular opening of gasket 18 is a downwardly depending tube 40 having the same valve arrangement and dispensing mechanism. The annular gasket 18 provides a seal between tube 40 and the container while the depending skirt 32 extends downwardly to a position slightly below the annular ring formed by the rolled flange or bead 15. This arrangement allows for the dispensing head member 30 to be rotated around the vertical axis of the container which causes tube 40 to turn in sealing gasket 18.

Mounted on tube 40 are holding lugs 41 positioned slightly below the bottom of annular insert 16. Telescopically arranged on tube 40 is an outer tube 42 having at the upper end thereof a notched-out portion 43. Midway of the length of tube 42 is an annular flange 44 adapted to receive a compression spring 45 located around the tube 42. The opposite end of tube 44 is cut on a bias to provide a piercing point 46 for rupturing the pliant film 14.

An alternate dispensing device forming a part of this invention is shown in FIGURES 10 through 12 in which an open top main container 10 has a bottom portion 11 and a cup-shaped cover 12 fitted over the opening of the top of the container 10 by clinching or rolling a flange 13 to provide an hermetic seal between the cover and the container. Disposed in container 10 is a depending sac 14 made of a pliant film, and fitting over the edge of the top rim of container 10 to form sealed compartments therein hermetically sealed from each other.

As heretofore described, an annular insert 16 is provided having a circular flange 17 adapted to receive and retain an annular sealing gasket 18 centrally with respect to the vertical axis of the container. Disposed within the annular opening of gasket 18 is a downwardly depending short tube 50. Advantageously, tube 50 may be positioned so that it is capable of turning about its vertical axis but incapable of upward or downward movement.

To the upper end of tube 50 is sealed a plastic-like tubular section 51 which is necked down at the top to form a dispensing nozzle 52. Positioned within tubes 50 and 51 is a valve seat 53 defining an opening 54 therein through which a valve stem 55 extends. Valve stem 55 has a valve seating portion 56 which is urged against valve seat 53 by compression spring 57 which is maintained under compression by lugs 58 positioned on the upper portion of valve stem 55. The top end of valve stem 55 extends into dispensing nozzle 52 so that any lateral stressing of the plastic-like tubular section 51 causes the valve seating portion 56 to unseat from valve seat 53 thereby permitting the contents of the can which is under pressure to be dispensed. The valve arrangement is covered by a cap 59 which protects the valves from being accidentally opened.

Positioned on the outer surface of the lower portion of tube 50 are oppositely disposed lugs or bosses 60, adapted to engage slots 61 defined in a short telescoping tube section 62. The lower end of tube section 62 can have outwardly extending blades or cutting edges 63. Positioned between the tube section 62 and the top of the container is a compression spring 64 which is under compression when the lugs 60 are engaged in slots 61 and which may be attached to tube section 62 at one end thereof. The tube section 62 can have opening 65 therein to facilitate the exodus of product from the container.

In operation, the dispensing device as illustrated is first charged with the desired ingredient. A film, such as nylon or "Mylar" or the like, in the form of a depending sac is then placed in the container with the bottom of the sac positioned above the first incorporated ingredient. The upper wall of the sac is formed over the top edge of container 10 so as to provide two compartments within the container. The second ingredient is then placed in the sac in the proper portion to that required to be mixed with the first ingredient to form a dispensable product. The cup-shaped cover 12 is then placed over the top edge of the container covering the upper wall of the sac. The cover is rolled in place by a clinching operation to provide an hermetic seal with the upper wall of the sac sealed between the top rim of the container and the cover. This clinching operation provides for a dual compartmental arrangement within the dispensing container. The annular insert, containing the slidable telescoping discharge device, is then assembled and rolled in place to provide an assembled container, or it may be assembled to the cup-shaped cover prior to its assembly to the container. The top cap 29 is then adjusted so that inert gas can be charged to the container through the orifice. After the container has been charged with inert gas and is under about 50 p.s.i. pressure, the top cap is secured downwardly to seat the valve so that the gas cannot escape.

When it is desired to use the containers assembled as described above, of the type covered by FIGURES 1 through 5, the dispensing head or member is raised causing tube 19 to slide in the annular gasket 18. As tube 19 is forced upward, it slides in tube 20 as tube 20 is restrained from upward motion by the underside of the annular insert 16 until notch 25 is in line with side 24 of spring clip arrangement 23 where the spring clip blocks any further upward movement of the discharge head. In this position, tube 20 is lockingly engaged in the end of tube 19 so that the pressing of the dispensing head downwardly causes the piercing end of tube 20 to pierce the bottom of the sac 14, thereby rupturing the sac. The discharge head is pushed downward until the depending skirt 32 engages bead 15 where the dispensing mechanism is ready to be operated and the ingredients from each compartment, due to the pressure in the container, have been thoroughly mixed.

Dispensing of the composition is achieved by loosening the top cap one or two turns and, thereafter, depressing the cap to cause the valve to become unseated. The pressure of the gas in the container exerts a force upon the top surface of the now mixed composition forcing the mixed ingredients through the tube, past the valve, and through the central bore and out of the discharge opening 38 for application.

An alternate rupturing arrangement is illustrated in FIGURES 6 through 9. In this arrangement it is not necessary to raise or lower the dispensing head but only to turn it about the vertical axis of the container to rupture the wall between the compartment in the container. By giving the depending skirt 32 a slight counterclockwise turn, the holding lugs 41 are brought out of engagement with notched out portion 43 of the outer telescoping tube 42 so that the compressed spring 45 is free to exert a downward force upon flange 44, thereby propelling the outer telescoped tube 42 downward and through the pliant film forming the wall separating the two compartments in the container to effect mixing of the separated ingredients.

In the alternate rupturing arrangement as shown in FIGURES 10 through 12, the piercing arrangement is spring-biased, and when the dispensing nozzle is turned counterclockwise, the tube section 62 is propelled by the spring 64 and the film 14 is ruptured by cutting edges 63 this permitting the ingredients from separate compartments to intermingle and be mixed by the propellent gas.

The diaphragm or film used to form separate compartments in the container may be a "Mylar" film, which is a trade name for a highly durable transparent, water repellant film of polyethylene terephthalate resin characterized by outstanding strength and chemical inertness. Many other materials may be used, e.g., polyethylene, polypropylene, nylon, rubber, cellophane, and the like. The film can be impervious to gas or be of the membrane type, depending on the use to which it is put. The thickness of the material will depend, of course, upon the condition under which the pressurized container is to operate, and the type of film will in like manner depend on the nature of the ingredients and to some extent on the product to be dispensed from the container.

Advantageously, a liquid or solid propellant can be stored in the bottom portion of the container so that it is kept separate from the ingredients in another compartment or compartments. When the film is ruptured, as heretofore described, the gaseous medium produced from the solid or liquid by vaporizing or subliming into the gaseous phase causes a high turbulence which produces rapid intimate mixing to form a pressure dispensable product. Thus having a propellant gas in one compartment of the container produces both a mixing and dispensing of the product when the film is ruptured and the container open to the atmosphere.

When a product having a heavy, creamy consistency is desired, it has been found that argon gas provides an excellent propellent and dispensing agent for the device of this invention. It has been found that argon provides an aerosol propellent which will dispense a product with the minimum of foaming. Control of foaming is important where the composition desired must have a creamy consistency with a minimum amount of bubbles therein, such as molding of dental impression. An excessive amount of bubbles would produce undesirable porosity, which would not allow the mold to present a continuous film surface having all the detailed impressions of the oral cavity that are necessary for making a usable denture. It has also been found that the degree of solubility can be controlled by providing a propellent gas which will give the desired results by mixing an insoluble gas, such as argon, with a more soluble gas, such as nitrous oxide. Mixtures of gases prepared in this manner can be used to give the desired results depending upon the amount of foaming that is acceptable and the nature of the ingredients forming the dispensed product.

It has been found that pressures between 30 and 50 p.s.i. give very good results, but other pressures can be used. When using high pressures, the thickness and bursting strength of the container must be taken into consideration. It has also been found that the range of pressure is somewhat dependent upon the physical conditions of the material to be dispensed and whether it is to be dispensed as an aerosol or a plastic mass.

It is to be understood that the container can be compartmentalized into a plurality of compartments having a series of pliant films forming the boundaries therebetween and that this concept comes within the scope and breadth of this invention.

It will be appreciated that the compartments in the container can be formed by a continuous film surrounding one or more of the ingredients and the film ruptured as heretofore described.

It is to be understood that any plunger or rupturing device which can be triggered to propel down through and rupture the walls separating the compartments of the container is within the scope of this invention.

Although the present invention has been shown and described in terms of preferred embodiments, nevertheless various changes and modifications such as are obvious to one skilled in the art are deemed to be within the purview of the invention.

What is claimed is:

1. A pressurized dispensing device for maintaining ingredients which are incompatible during storage separated until use is desired which comprises a sealed container; sealed compartments in said container separated by a rupturable film; a pressurized discharge gas in at least one of said compartments; discharge means positioned in said container above said film for discharging the ingredients therefrom, rupturing means in said container disposed above said rupturable film, said rupturing means telescopingly engaging a portion of said discharge means; and means in said container for projecting said rupturing means through said film into the compartment therebelow to bring about a mixing of the ingredients, said rupturing means being separated from its telescopic engagement with a portion of said discharge means after projecting through said film.

2. The pressurized dispensing device as claimed in claim 1 in which a release means functions with said rupturing means whereby partial rotation of said discharge means about the vertical axis of said container releases said rupturing means.

3. The pressurized dispensing device as claimed in claim 1 in which said projecting includes spring means to propel the rupturing means through said film.

4. A pressurized dispensing device for maintaining ingredients which are incompatible during storage separated until use is desired, comprising a pressure container having a dispensing means in one end thereof, pliant film separating said container into compartments, a first discharge tube connected to said dispensing means depending into said container and terminating in a position above said film, said discharge tube capable of partial rotation by said dispensing means, a second discharge tube telescopically arranged on said first discharge tube and in said container, holding means on said first discharge tube for holding said second discharge tube in fully telescoping engagement above said film, downward biasing means positioned between the top of said container and said second discharge tube whereby partial rotation by said dispensing means releases said holding means to allow said spring biasing means to propel the end of said second discharge tube through said film thereby rupturing it.

References Cited in the file of this patent

UNITED STATES PATENTS

| 718,941 | Wigmore | Jan. 20, 1903 |
| 1,324,206 | Nickell | Dec. 9, 1919 |
| 2,021,493 | Trueblood | Nov. 19, 1935 |
| 2,139,097 | Piquerez | Dec. 6, 1938 |
| 2,198,564 | Robinson | Apr. 23, 1940 |
| 2,550,840 | Martin et al. | May 1, 1951 |
| 2,659,370 | Smith | Nov. 17, 1953 |
| 2,721,552 | Nosik | Oct. 25, 1955 |
| 2,733,836 | Switzer | Feb. 7, 1956 |
| 2,804,929 | Plummer | Sept. 3, 1957 |
| 2,878,965 | Hirt et al. | Mar. 24, 1959 |
| 2,888,208 | Fedit | May 26, 1959 |

FOREIGN PATENTS

| 778,124 | Great Britain | July 3, 1957 |